US012593164B2

(12) United States Patent
Shen et al.

(10) Patent No.: US 12,593,164 B2
(45) Date of Patent: Mar. 31, 2026

(54) OWS EARPHONE WITH ANC FUNCTION

(71) Applicant: Risuntek Inc., Dongguan (CN)

(72) Inventors: Qing Kai Shen, Dongguan (CN); Xin Li, Dongguan (CN)

(73) Assignee: RISUNTEK INC., Dongguan (CN)

( * ) Notice: Subject to any disclaimer, the term of this patent is extended or adjusted under 35 U.S.C. 154(b) by 285 days.

(21) Appl. No.: 18/399,717

(22) Filed: Dec. 29, 2023

(65) Prior Publication Data

US 2025/0193576 A1 Jun. 12, 2025

(30) Foreign Application Priority Data

Dec. 12, 2023 (CN) ......................... 202311710145.6

(51) Int. Cl.
*H04R 1/10* (2006.01)
*G10K 11/178* (2006.01)

(52) U.S. Cl.
CPC ..... *H04R 1/1083* (2013.01); *G10K 11/17823* (2018.01); *G10K 11/17873* (2018.01); *H04R 1/105* (2013.01); *G10K 2210/1081* (2013.01); *H04R 2420/07* (2013.01); *H04R 2460/01* (2013.01); *H04R 2460/09* (2013.01)

(58) Field of Classification Search
CPC .. H04R 1/1083; H04R 1/105; H04R 2420/07; H04R 2460/01; H04R 2460/09; H04R 2201/10; H04R 1/10; H04R 1/1016; G10K 11/17823; G10K 11/17873; G10K 2210/1081
USPC ......................................................... 381/71.8
See application file for complete search history.

(56) References Cited

U.S. PATENT DOCUMENTS

| | | | | |
|---|---|---|---|---|
| 2010/0195842 | A1* | 8/2010 | Sibbald | G10K 11/17861 381/71.6 |
| 2013/0129105 | A1* | 5/2013 | Hua | H04R 1/1083 381/71.6 |
| 2021/0168489 | A1* | 6/2021 | Zhang | H04R 1/1016 |
| 2021/0329376 | A1* | 10/2021 | Li | H04R 1/1058 |
| 2023/0116597 | A1* | 4/2023 | Yamamoto | H04R 1/1041 381/71.2 |
| 2023/0353921 | A1* | 11/2023 | Lee | G10K 11/175 |
| 2024/0054986 | A1* | 2/2024 | Matsuo | G10K 11/17881 |

* cited by examiner

*Primary Examiner* — Carolyn R Edwards
*Assistant Examiner* — Friedrich Fahnert
(74) *Attorney, Agent, or Firm* — Leong C. Lei

(57) ABSTRACT

An OWS earphone with an ANC function is disclosed. The OWS earphone includes an OWS earphone body and an auxiliary noise cancellation accessory. The OWS earphone body includes an earphone shell and a sound-generating unit. The earphone shell has a sound output area on an outer surface thereof. The auxiliary noise cancellation accessory includes an accessory body. The accessory body has a partition wall and a noise cancellation space surrounded by the partition wall. The accessory body is detachably connected to the OWS earphone body. The OWS earphone has an ANC function to cancel ambient sounds in noisy environments.

17 Claims, 15 Drawing Sheets

OWS EARPHONE WITH ANC FUNCTION

BACKGROUND OF THE INVENTION

1. Field of the Invention

The present invention relates to an OWS (open wireless stereo) earphone, and more particularly to an OWS earphone with an ANC (active noise cancellation) function.

2. Description of the Prior Art

OWS earphones, namely, open wireless stereo earphones, have many advantages. For example, OWS earphones do not go into the ears and are comfortable to wear and do not put any pressure on the ears. Wearing OWS earphones for a long period of time will not cause discomfort or pressure, and will reduce hearing damage. OWS earphones have an open design. Wearing OWS earphones will not block out ambient sounds, avoiding the problem of blocking communication with the ambient environment. OWS earphones have no sound leakage, dynamic synthesis of sound sources, directional sound propagation, and suppression of sound leakage. OWS earphones are non-damaging, reducing hearing damage and avoiding ear canal hygiene problems.

Therefore, people pay more attention to OWS earphones, and many people use this type of earphones. In general, OWS earphones have three forms, including ear-hook earphones, sports earphones and ear-clip earphones, so as to meet the diversified needs of users. Users have a high degree of acceptance of OWS earphones. OWS earphones are widely used in different environments. As the above-mentioned advantages of OWS earphones, regarding the design of OWS earphones, the fixed thinking in the industry is to adopt an open design to avoid the problem of blocking communication with the ambient environment. In order to ensure a comfortable and unburdened wearing experience and to avoid pressure on the ears, the sound output portion of the outer shell of the OWS earphone is generally flat or slightly curved. When wearing the OWS earphone, the sound output portion is kept clear of the ear or in partial contact with the ear. In actual use, in noisy environments, such as in the subway, ambient sounds will cause interference to users. When purchasing earphones, users will choose earphones with or without a noise cancellation function. It means that users have to accept the shortcomings of the conventional OWS earphones when used in noisy environments.

Accordingly, the inventor of the present invention has devoted himself based on his many years of practical experiences to solve these problems.

SUMMARY OF THE INVENTION

In view of the shortcomings of the prior art, the primary object of the present invention is to provide an OWS earphone with an ANC function, which is a breakthrough from the fixed thinking in the industry. The OWS earphone has an OWS earphone body. An auxiliary noise cancellation accessory is optionally, detachably connected to the OWS earphone body, so that the OWS earphone has an ANC function. The OWS earphone can reduce or even cancel ambient sounds when used in noisy environments.

In order to achieve the above object, the present invention adopts the following technical solutions:

An OWS (open wireless stereo) earphone with an ANC (active noise cancellation) function comprises an OWS earphone body and an auxiliary noise cancellation accessory.

The OWS earphone body includes an earphone shell and a sound-generating unit in the earphone shell. The earphone shell has a sound output area on one side of an outer surface of the earphone shell, facing a human body.

The auxiliary noise cancellation accessory includes an accessory body. The accessory body has a partition wall and a noise cancellation space surrounded by the partition wall.

The accessory body is detachably connected to the OWS earphone body. The noise cancellation space has a first end corresponding to and communicating with the sound output area and a second end facing the human body. When in use, sounds generated by the sound-generating unit enter the noise cancellation space from the sound output area via the first end of the noise cancellation space and are transmitted to the human body from the second end of the noise cancellation space.

Compared with the prior art, the present invention has obvious advantages and beneficial effects. Specifically, it can be known from the above technical solution that the present invention is a breakthrough from the fixed thinking in the industry. The auxiliary noise cancellation accessory is optionally, detachably connected to the OWS earphone body, so that the OWS earphone has an ANC function. The OWS earphone can reduce or even cancel ambient sounds when used in noisy environments (or other environments where excessive ambient sounds input is undesirable). In other environments, the auxiliary noise cancellation accessory can be removed, and the user only wears the OWS earphone. The present invention has a simple structure and a clever concept, and is applicable to all existing OWS earphones. The present invention makes a slight change in the design of the original OWS earphone, or even the original OWS earphone does not need to be changed. For example, the auxiliary noise cancellation accessory is detachably connected to the OWS earphone body in a magnetic attraction manner or in a sleeving manner, without changing the design of the original OWS earphone, only the additional auxiliary noise cancellation accessory is provided. Thus, there is no need to increase production costs too much. When in use, it is easy to disassemble, assemble and operate the present invention. The auxiliary noise cancellation accessory can be used as an optional accessory, and can be designed in different colors, materials and shapes to meet diverse designs, giving users a 10 better experience. It is practical and suitable for popularization and application.

Embodiments of the present invention will now be described, by way of example only, with reference to the accompanying drawings.

DETAILED DESCRIPTION OF THE PREFERRED EMBODIMENTS

Figure 1:
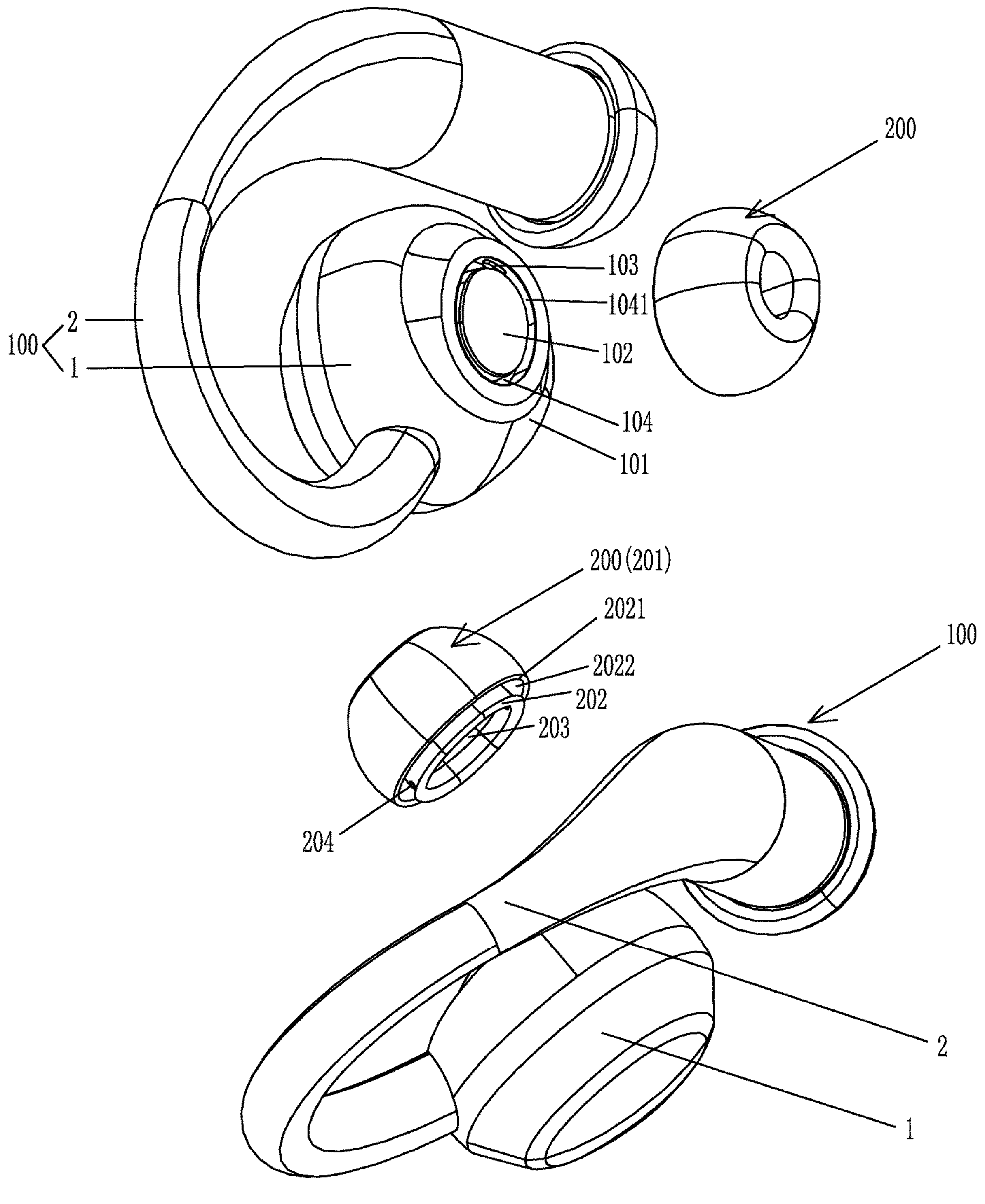
FIG. 1 is an exploded view of an OWS earphone body and an auxiliary noise cancellation accessory according to a first embodiment of the present invention (an ear-hook OWS earphone)

FIGS. 1 to 15 show the specific structures of embodiments of the present invention.

An OWS (open wireless stereo) earphone with an ANC (active noise cancellation) function comprises an OWS earphone body 100 and an auxiliary noise cancellation accessory 200. The OWS earphone body 100 includes an earphone shell 101 and a sound-generating unit (not shown) in the earphone shell 101. The earphone shell 101 has a sound output area 102 on one side of the outer surface of the earphone shell 101, facing the human body. The auxiliary noise cancellation accessory 200 includes an accessory body 201. The accessory body 201 has a partition wall 202 and a noise cancellation space 203 surrounded by the partition wall 202. The accessory body 201 is detachably connected to the OWS earphone body 100. The noise cancellation space 203 has a first end corresponding to and communicating with the sound output area 102 and a second end facing the human body, so that the sounds generated by the sound-generating unit enter the noise cancellation space 203 from the sound output area 102 via the first end of the noise cancellation space 203 and are transmitted to the human body from the second end of the noise cancellation space 203. The noise cancellation space 203 may be designed in different shapes for the auxiliary noise cancellation accessory 200 to be fitted on the OWS earphone body 100 to constitute an in-ear, semi-in-ear or on-ear earphone.

The OWS earphone may be in the form of an ear-hook OWS earphone, sports OWS earphone or ear-clip OWS earphone.

Figure 2:
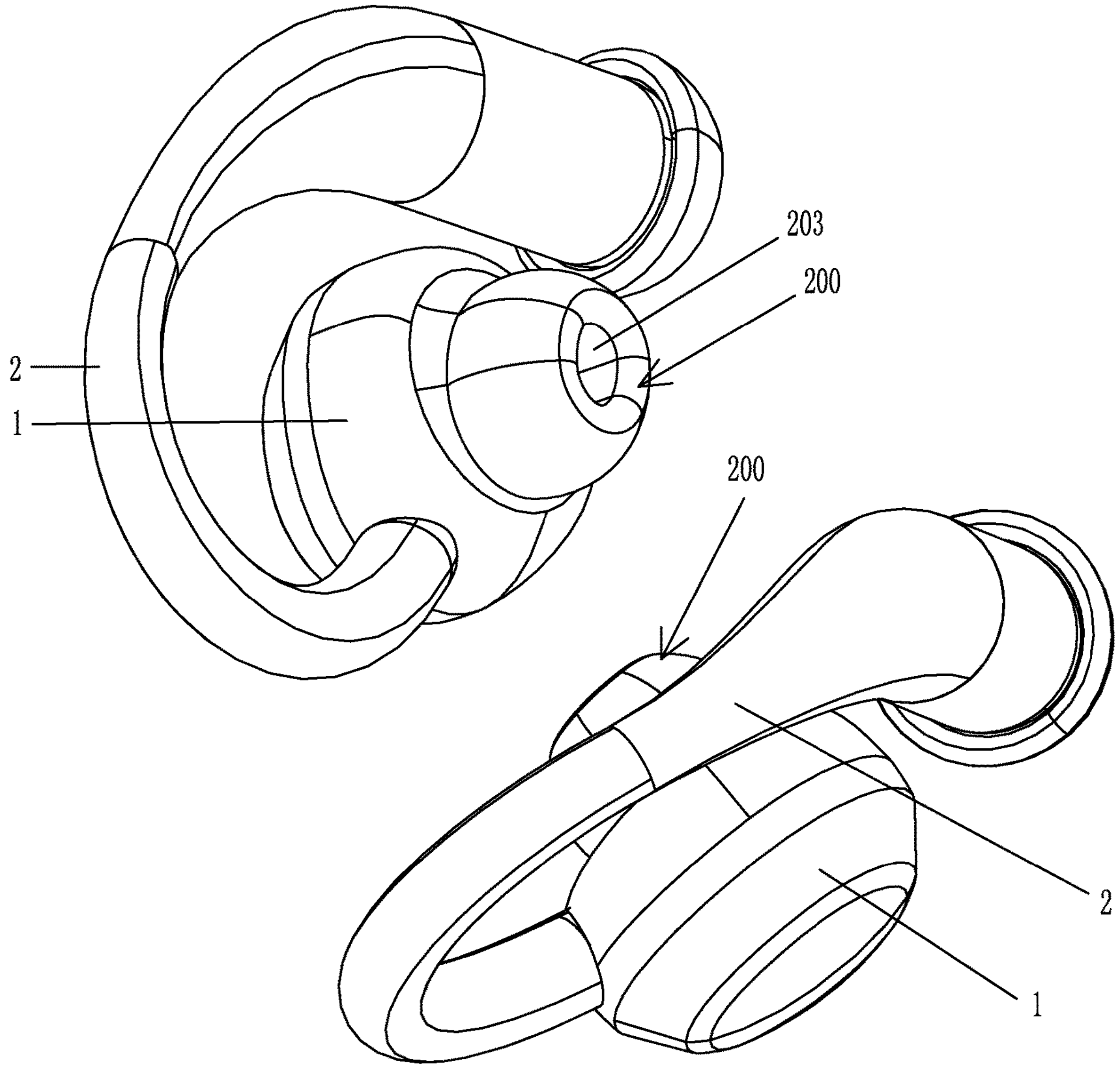
FIG. 2 is a perspective view of the OWS earphone body and the auxiliary noise cancellation accessory according to the first embodiment of the present invention (an ear-hook OWS earphone)
Figure 3:
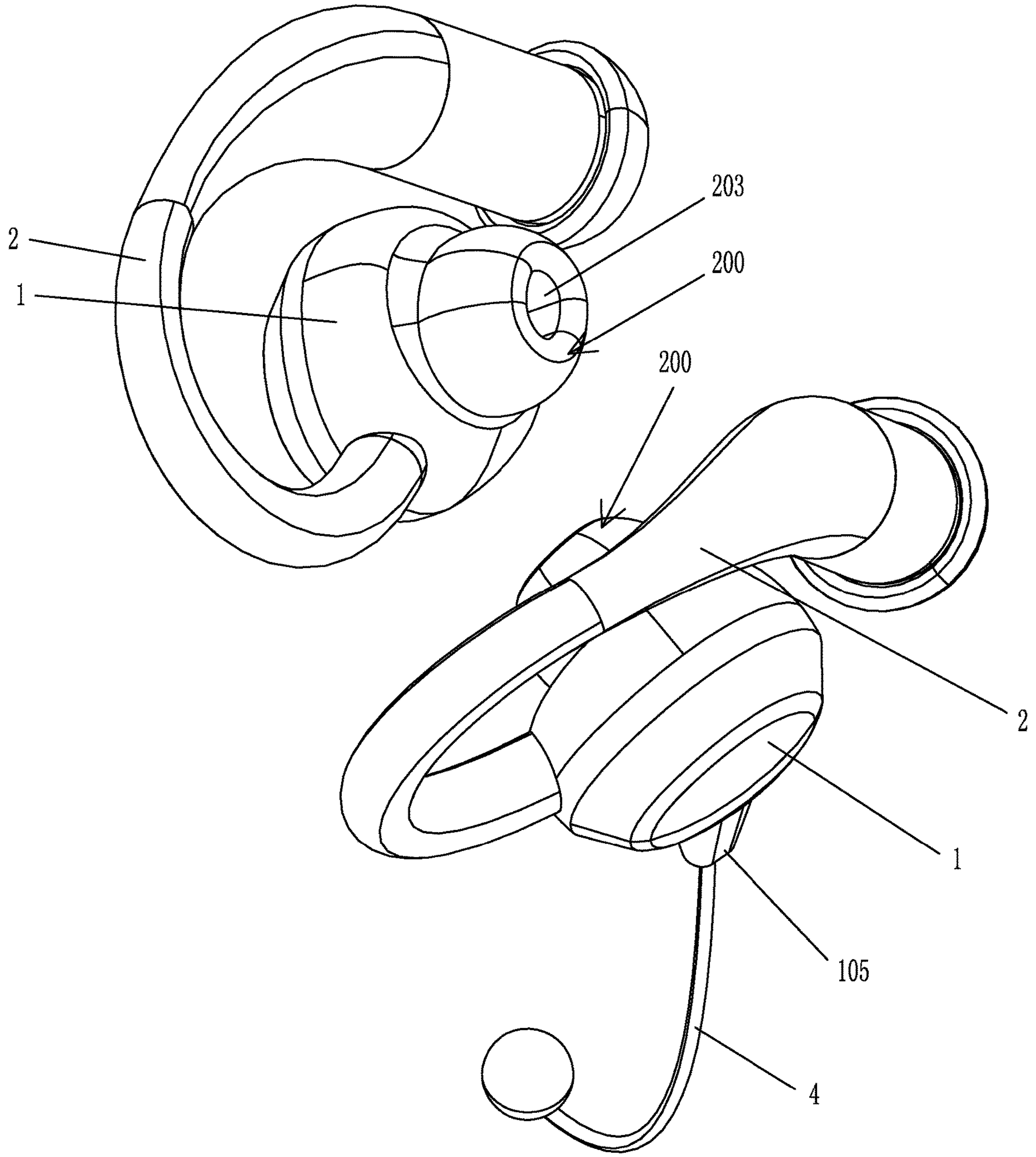
FIG. 3 is a perspective view of an OWS earphone body, an auxiliary noise cancellation accessory and a mic according to a second embodiment of the present invention (an ear-hook OWS earphone with a mic)
Figure 4:
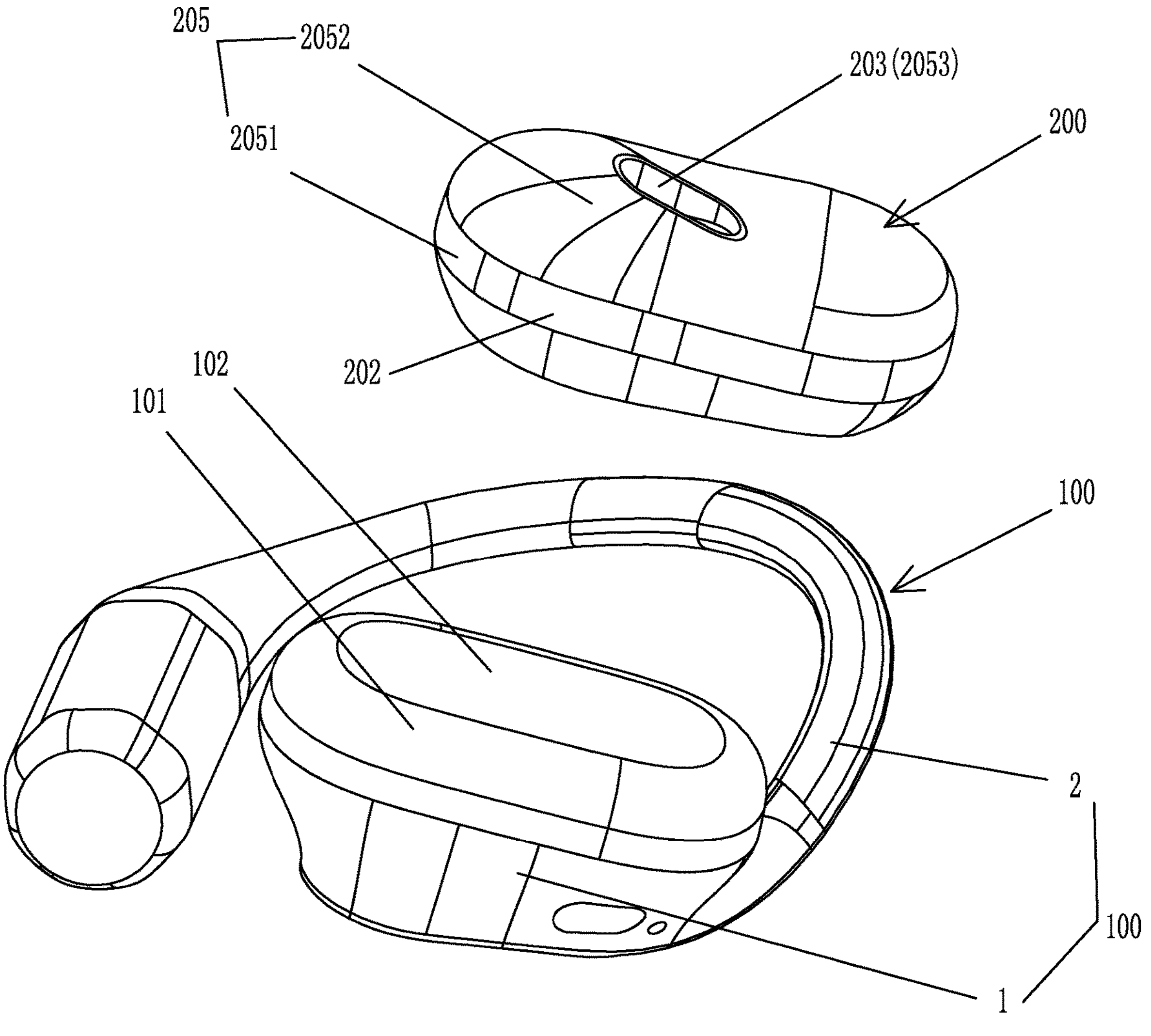
FIG. 4 is an exploded view of an OWS earphone body and an auxiliary noise cancellation accessory according to a third embodiment of the present invention (an ear-hook OWS earphone)
Figure 5:
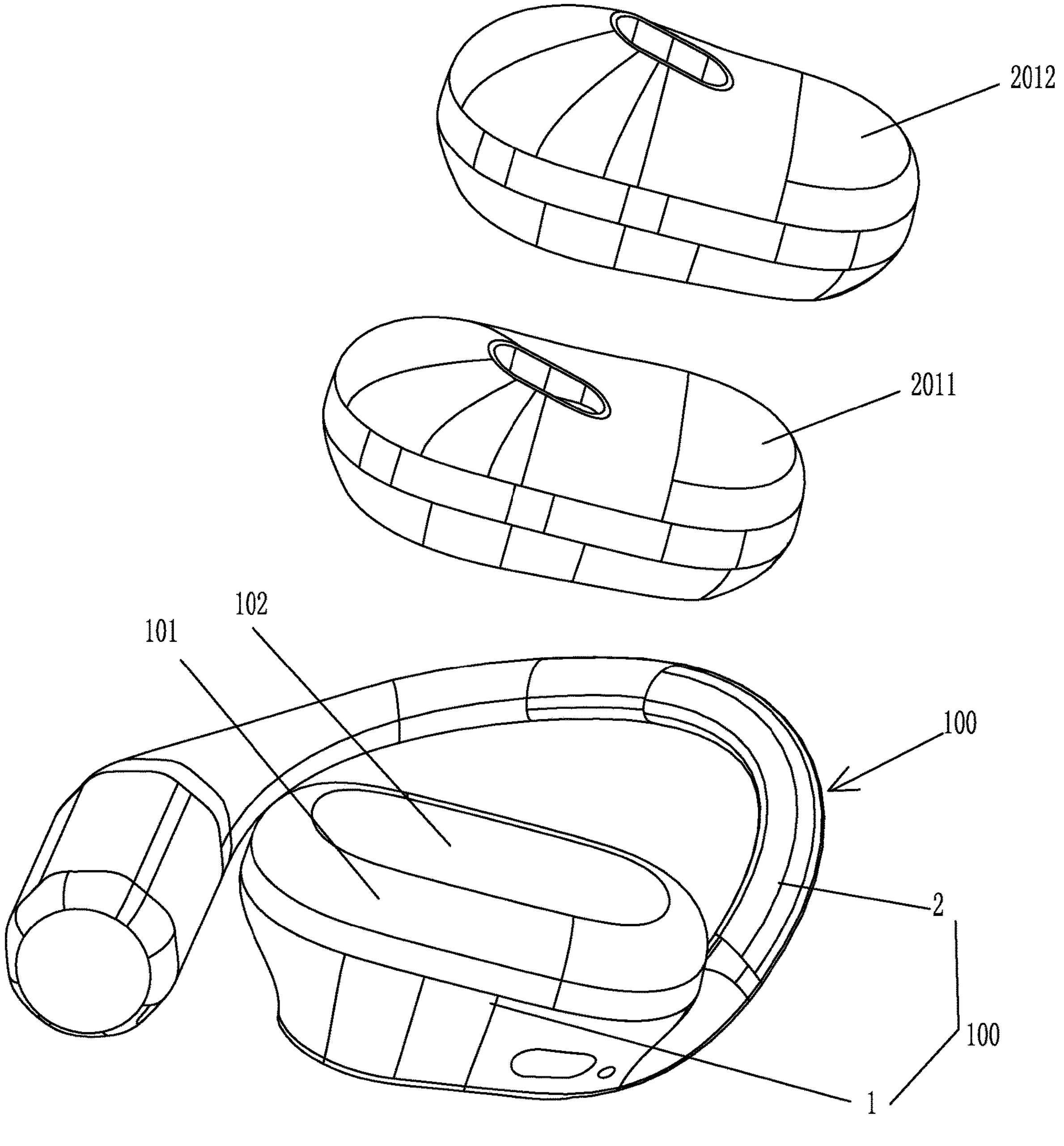
FIG. 5 is another exploded view of the OWS earphone body and the auxiliary noise cancellation accessory according to the third embodiment of the present invention (an ear-hook OWS earphone)
Figure 6:
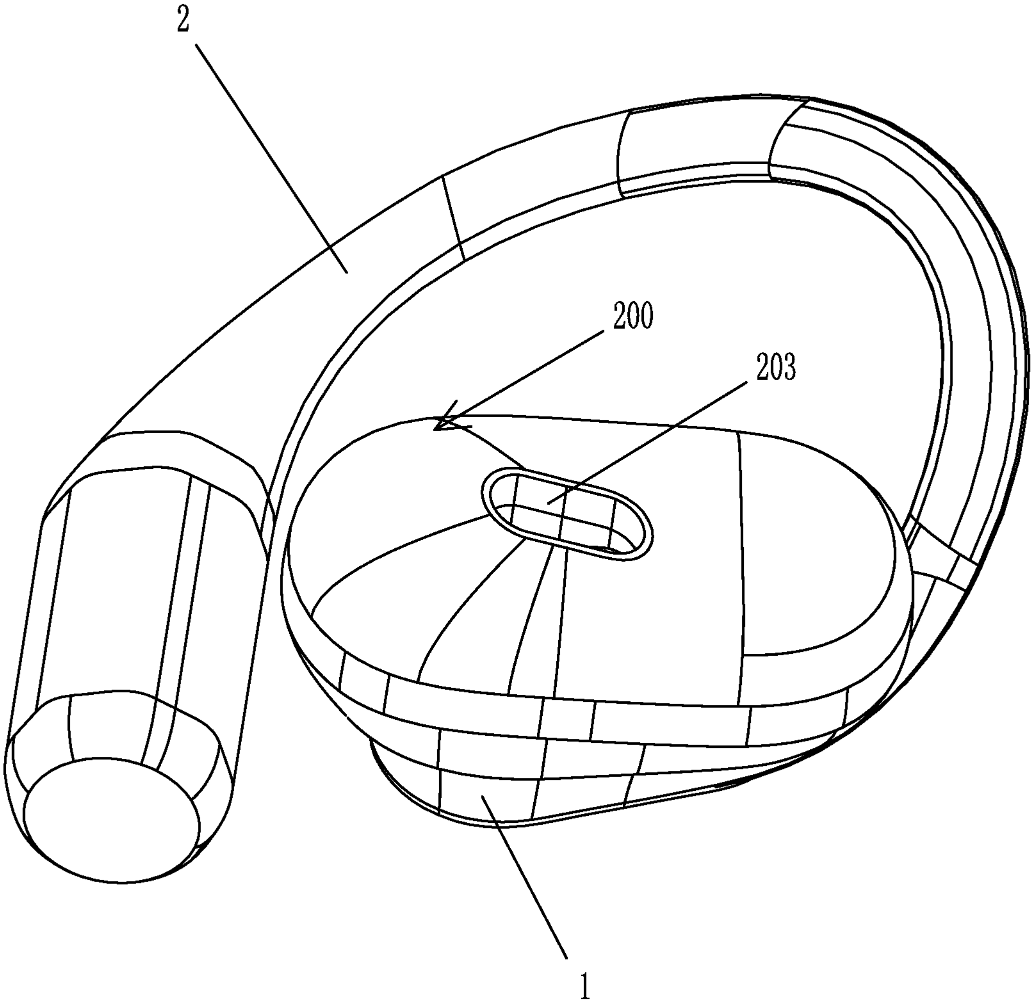
FIG. 6 is a perspective view of the OWS earphone body and the auxiliary noise cancellation accessory according to the third embodiment of the present invention (an ear-hook OWS earphone)
Figure 7:
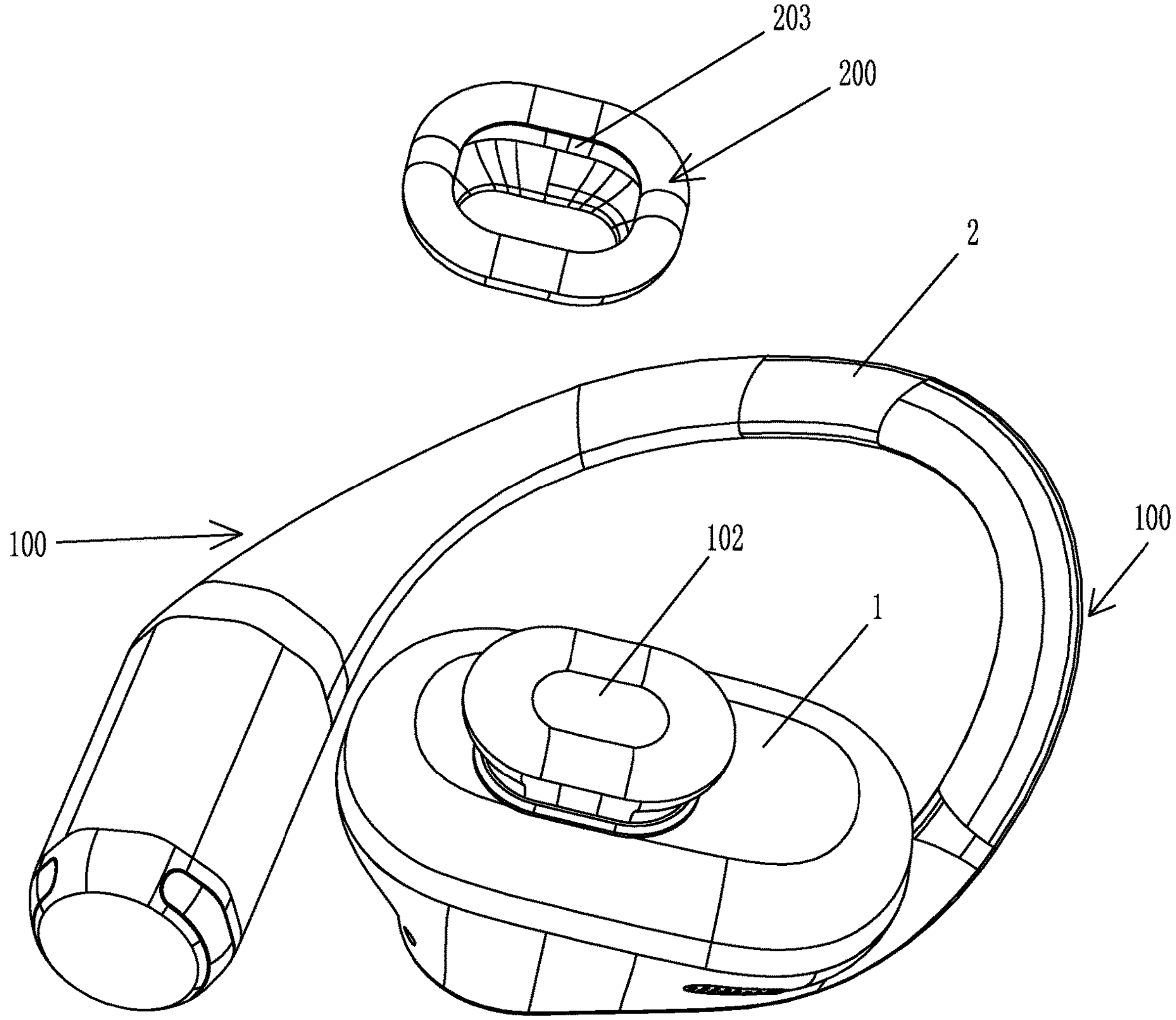
FIG. 7 is an exploded view of an OWS earphone body and an auxiliary noise cancellation accessory according to a fourth embodiment of the present invention (an ear-hook OWS earphone)
Figure 8:
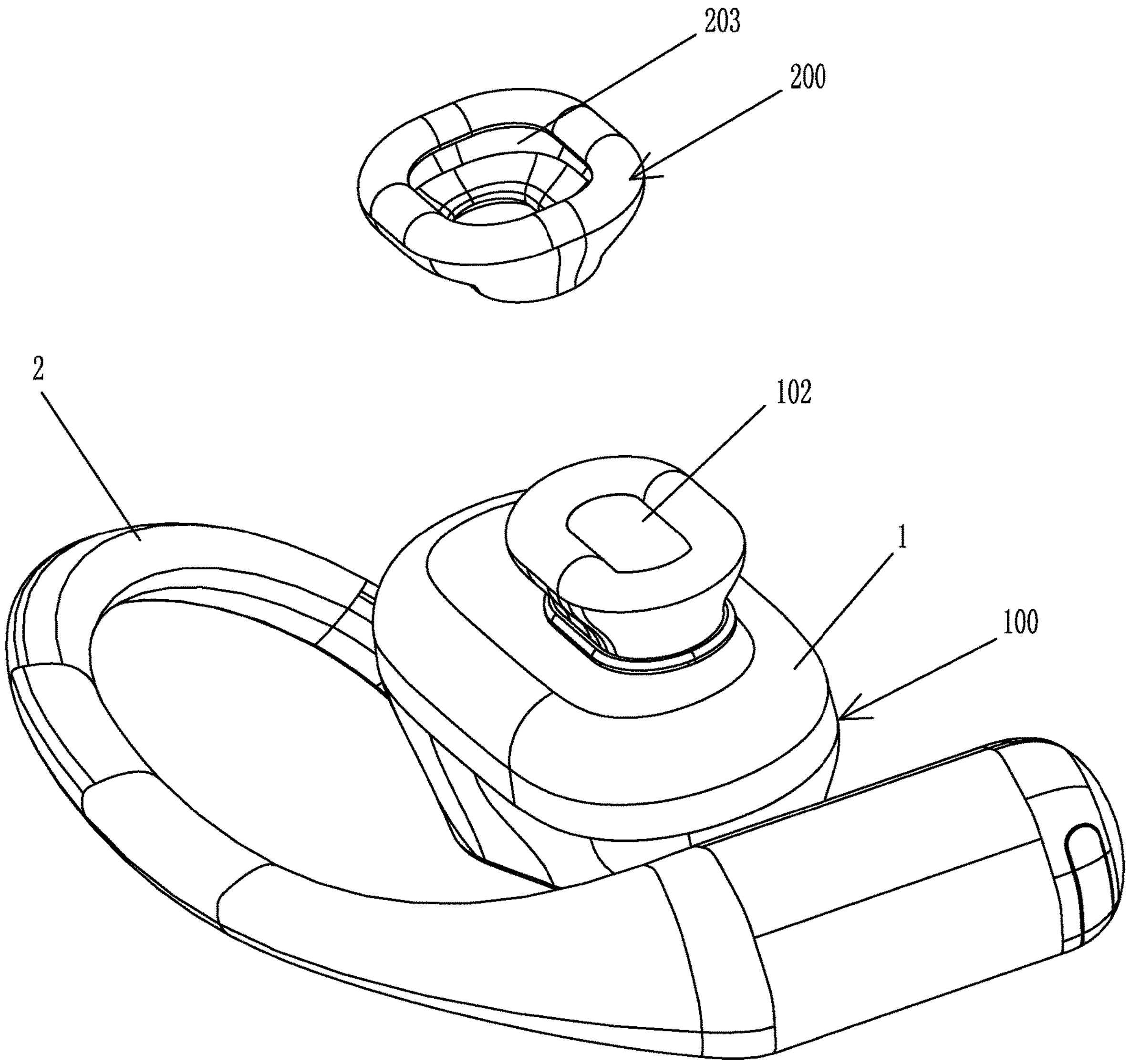
FIG. 8 is another exploded view of the OWS earphone body and the auxiliary noise cancellation accessory according to the fourth embodiment of the present invention (an ear-hook OWS earphone)
Figure 9:
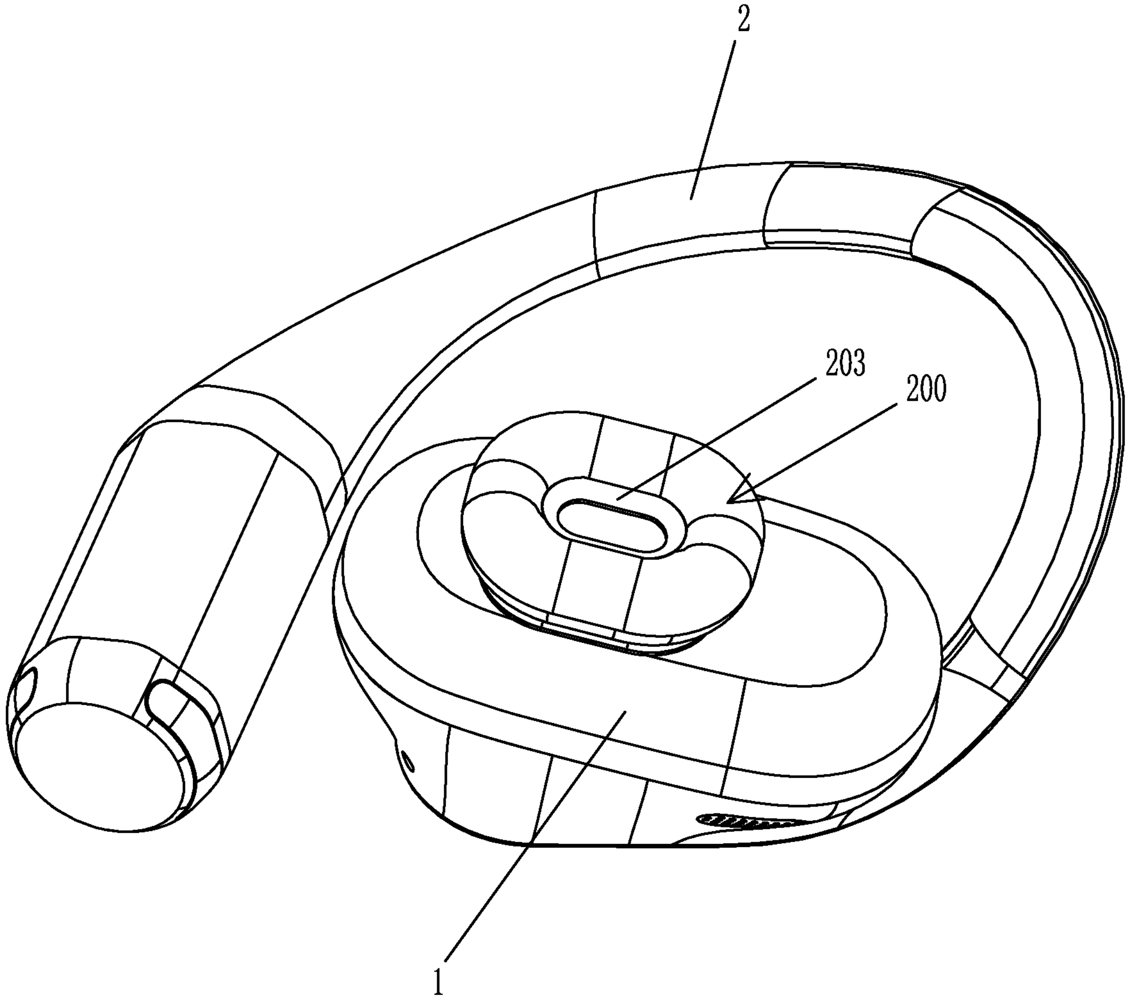
FIG. 9 is a perspective view of the OWS earphone body and the auxiliary noise cancellation accessory according to the fourth embodiment of the present invention (an ear-hook OWS earphone)

FIGS. 1 to 9 show four embodiments of the ear-hook OWS earphone. The OWS earphone body 100 is in the form of an ear-hook OWS earphone body. The earphone shell 101 is connected to an ear hook 2 (defined as a first ear hook). In specific design and production, the first ear hook may be fixedly or detachably connected to the earphone shell 101. Optionally, a mic 4 is fixedly or detachably connected to the OWS earphone body 100. As shown in FIG. 3, the earphone shell 101 and the sound-generating unit may be disposed on a TWS (true wireless stereo) earphone unit 1. The ear hook 2 is detachably connected to the TWS earphone unit 1. The OWS earphone body 100 further has a mic connecting portion 105. The mic 4 is detachably connected to the mic connecting portion 105, used in telephone communication for the ear-hook earphone.

Figure 10:
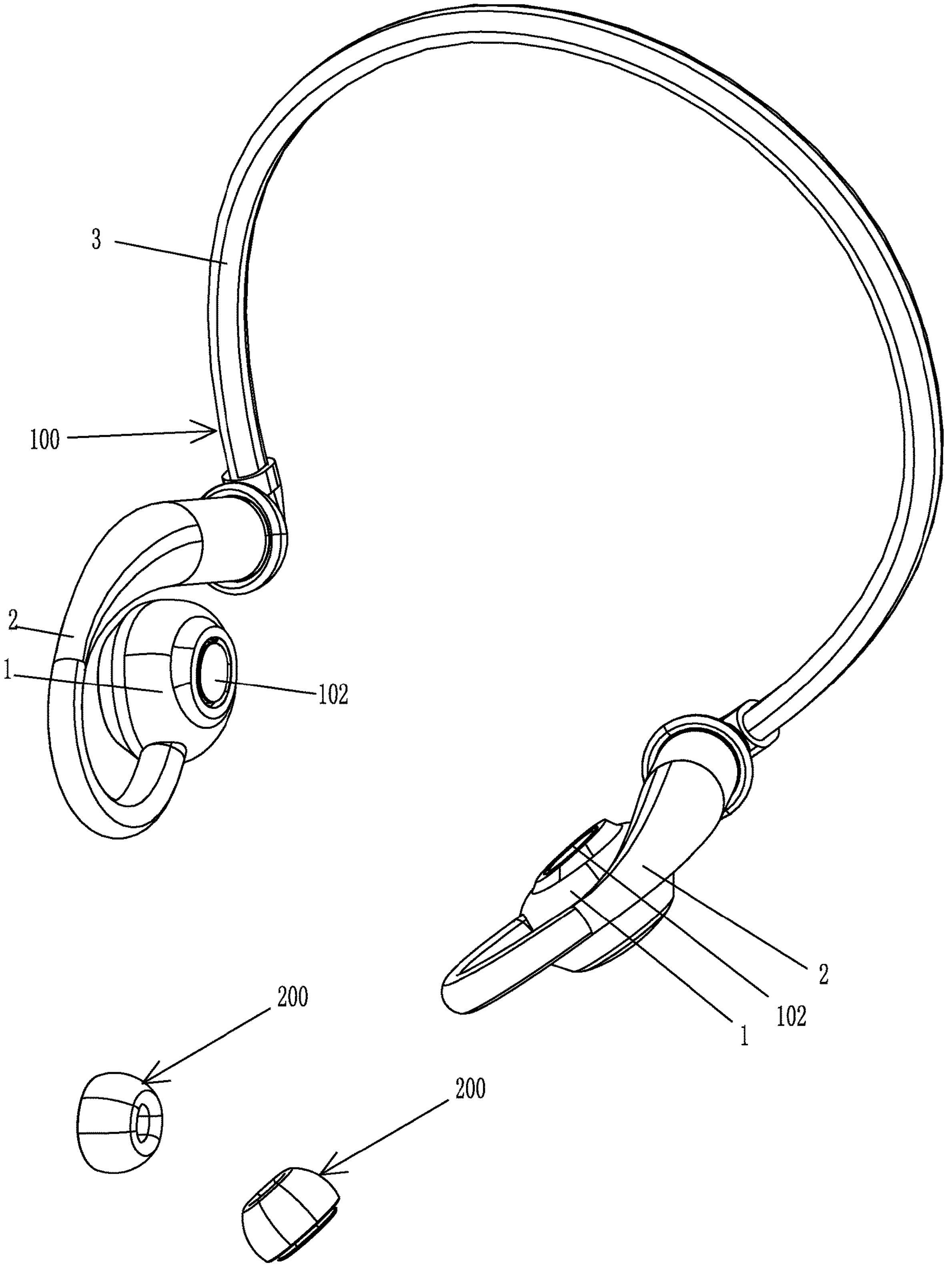
FIG. 10 is an exploded view of an OWS earphone body and an auxiliary noise cancellation accessory according to a fifth embodiment of the present invention (a sports OWS earphone)
Figure 11:
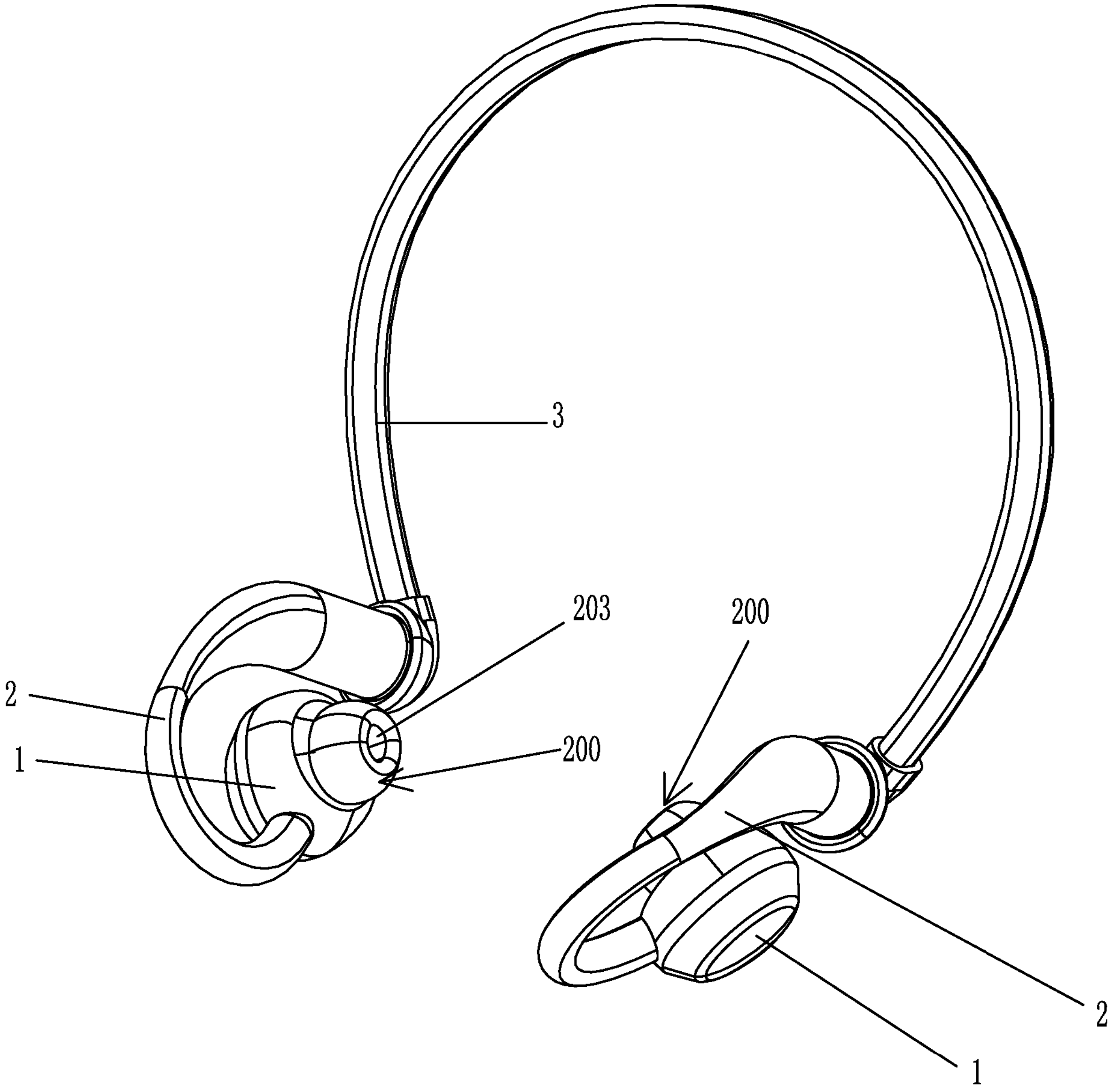
FIG. 11 is a perspective view of the OWS earphone body and the auxiliary noise cancellation accessory according to the fifth embodiment of the present invention (a sports OWS earphone)
Figure 12:
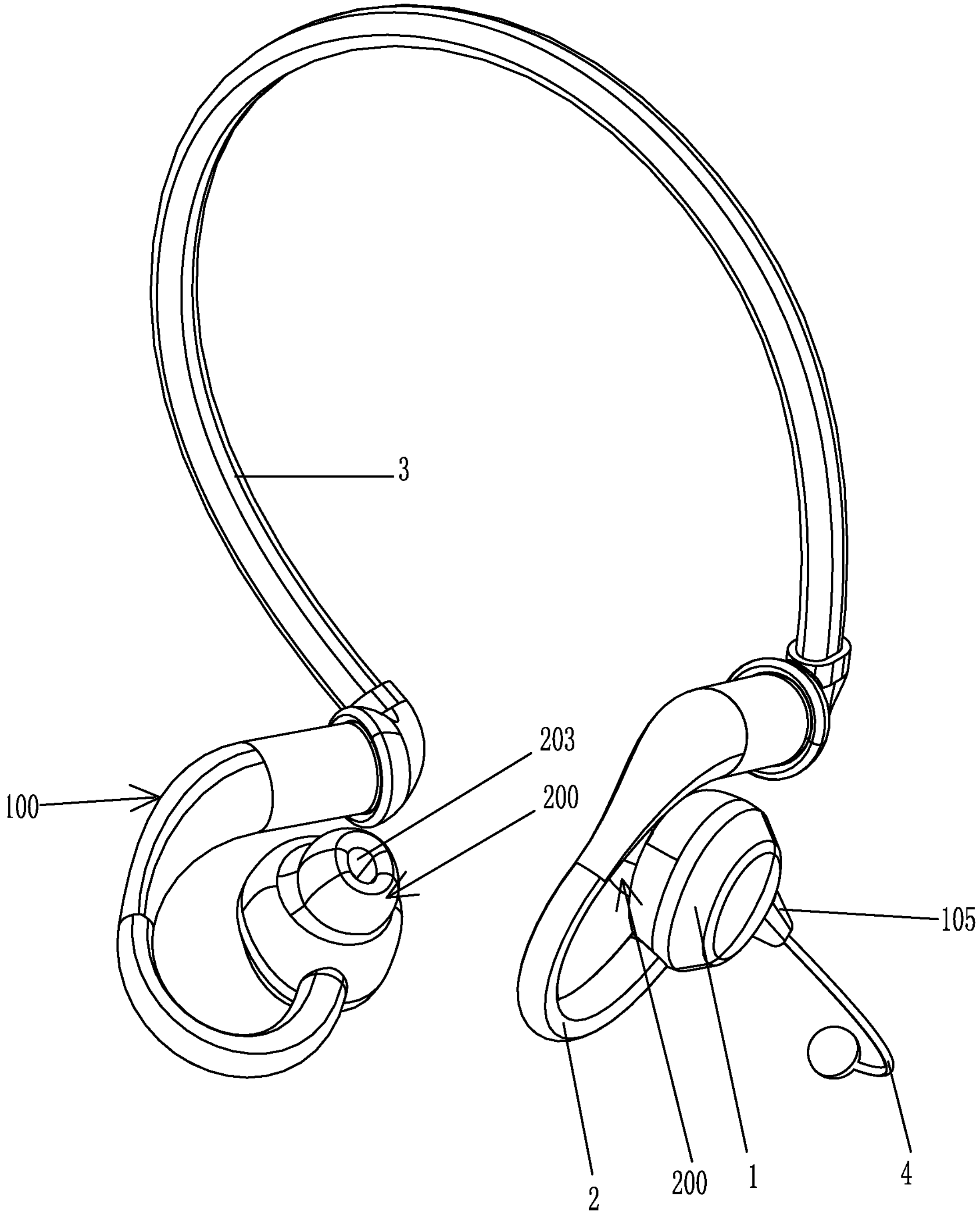
FIG. 12 is a perspective view of an OWS earphone body and an auxiliary noise cancellation accessory according to a sixth embodiment of the present invention (a sports OWS earphone with a mic)

FIGS. 10 to 12 show two embodiments of the sports OWS earphone. The OWS earphone body 100 is in the form of a sports OWS earphone body. The earphone shell 101 is connected to an ear hook 2 (defined as a second ear hook). The rear end of the second ear hook 2 is connected to a neck band 3. In specific design and production, the second ear hook may be fixedly or detachably connected to the earphone shell 101. Optionally, the mic 4 is fixedly or detachably connected to the OWS earphone body 100. As shown in FIG. 12, the earphone shell 101 and the sound-generating unit may be disposed on a TWS earphone unit 1. The ear hook 2 is detachably connected to the TWS earphone unit 1. The neck band 3 is detachably connected to the rear end of the second ear hook 2. The neck band 3 may be hung on the neck of the human body, used for a sports OWS earphone. Furthermore, the OWS earphone body 100 further has a mic connecting portion 105. A mic 4 is detachably connected to the mic connecting portion 105, used in telephone communication for the sports earphone.

Figure 13:
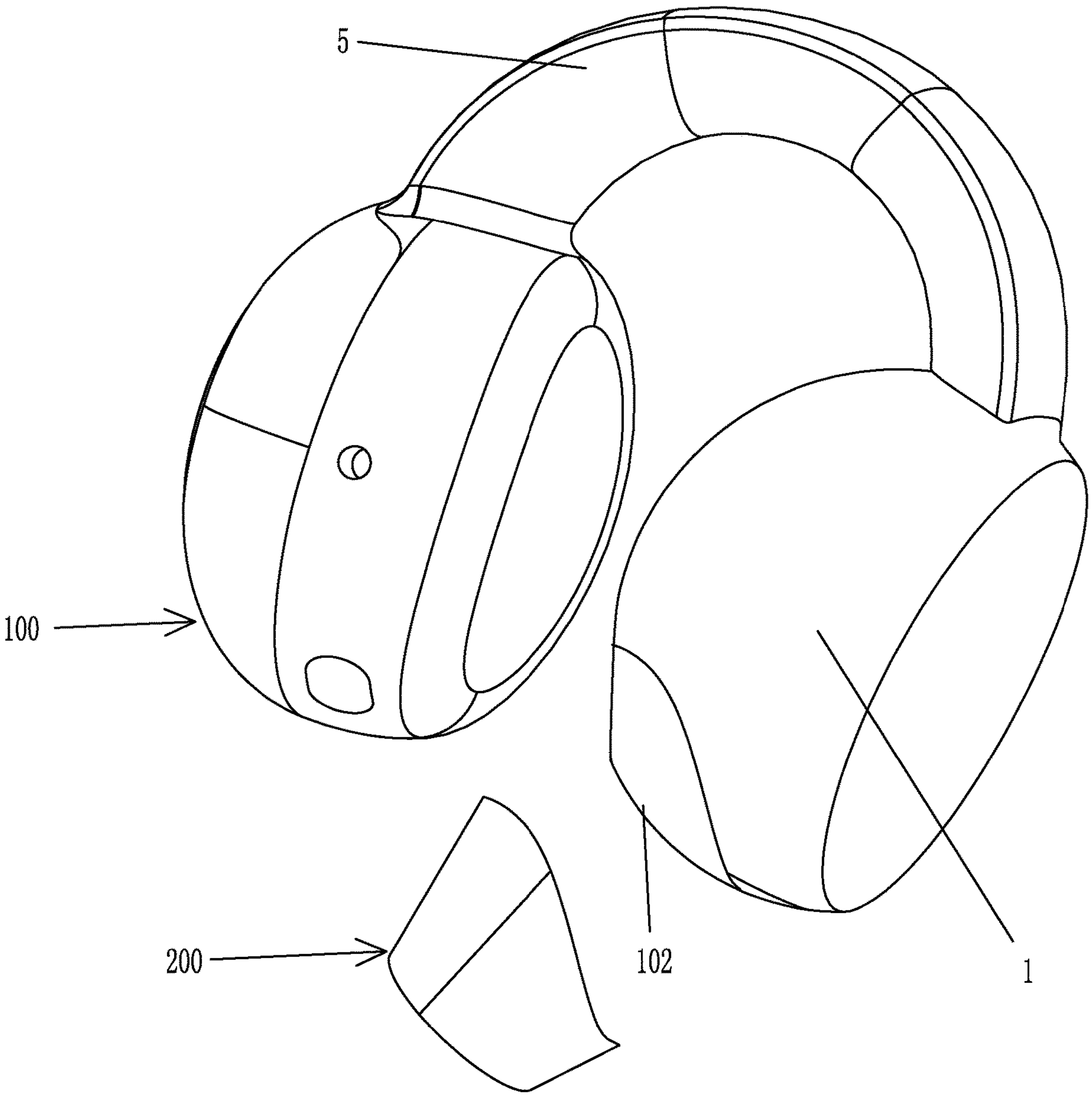
FIG. 13 is an exploded view of an OWS earphone body and an auxiliary noise cancellation accessory according to a seventh embodiment of the present invention (an ear-clip OWS earphone)
Figure 14:
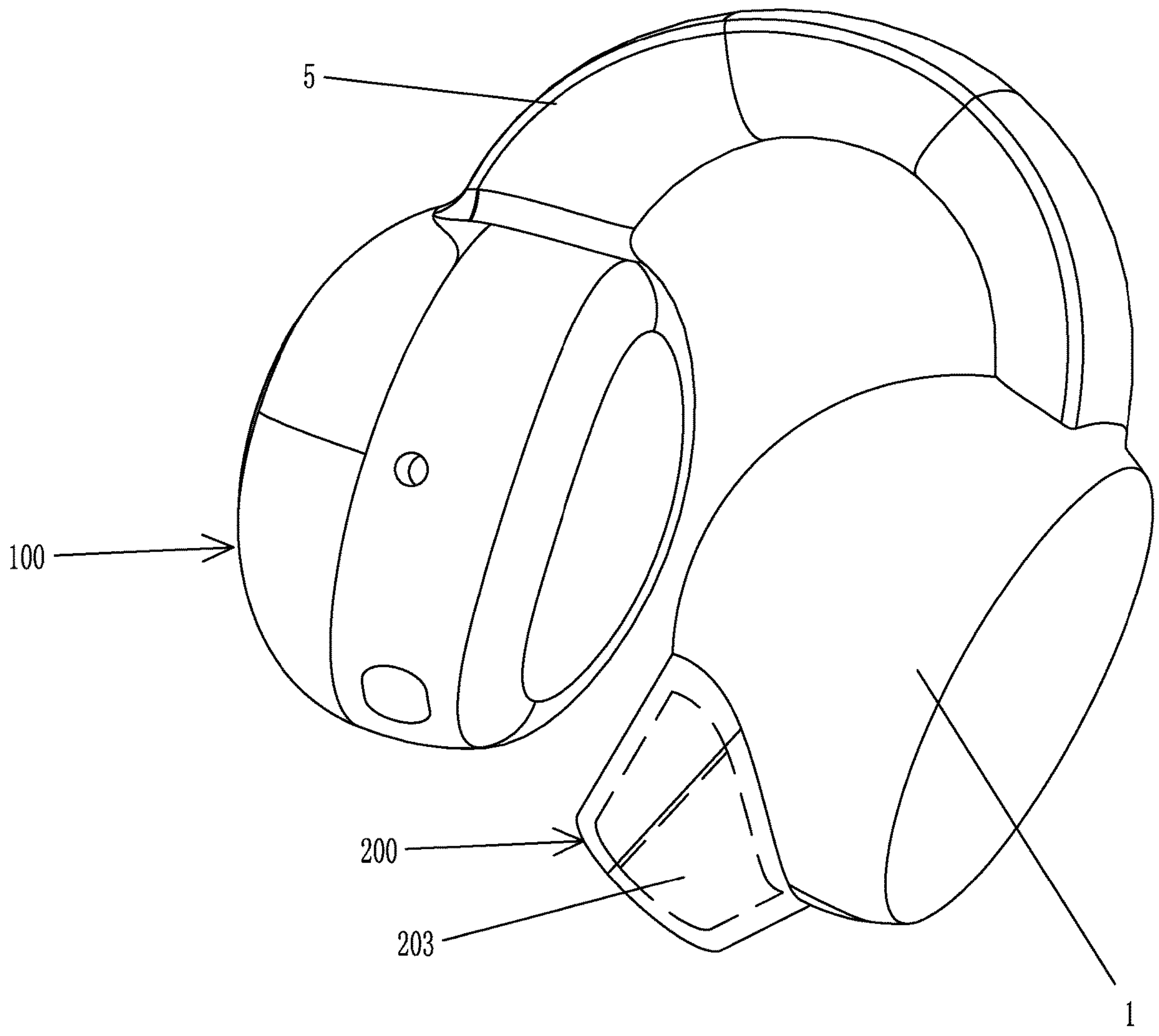
FIG. 14 is a perspective view of the OWS earphone body and the auxiliary noise cancellation accessory according to the seventh embodiment of the present invention (an ear-clip OWS earphone)

FIG. 13 and FIG. 14 show one embodiment of the ear-clip OWS earphone. The OWS earphone body 100 is in the form of an ear-clip OWS earphone body. The earphone shell 101 is connected to an ear clip 5. In specific design and production, the ear clip may be fixedly or detachably connected to the earphone shell 101. Optionally, the mic 4 is fixedly or detachably connected to the OWS earphone body 100, used in telephone communication for the ear-clip earphone.

For each embodiment, the accessory body 201 is detachably connected to the OWS earphone body 100 in different manners, for example: the auxiliary noise cancellation accessory 200 is detachably connected to the earphone shell 101 in a snap-fit manner; or the auxiliary noise cancellation accessory 200 is detachably connected to the earphone shell 101 in a sleeving manner; or the auxiliary noise cancellation accessory 200 is detachably connected to the earphone shell 101 in a magnetic attraction manner; or the auxiliary noise cancellation accessory 200 is removably bonded to the earphone shell 101, or the accessory body 201 is detachably connected to the OWS earphone body 100 in other manners. When the user wears the OWS earphone, the original shape of the OWS earphone body 100 is enough to meet the requirements of normal wearing and is not easy to fall off when worn. After the auxiliary noise cancellation accessory 200 is installed on the OWS earphone body 100, the auxiliary noise cancellation accessory 200 is located between the OWS earphone body 100 and a human body surface (e.g., an ear) when in use, normally in a sandwiched state. Therefore, it is not necessary to require that the auxiliary noise cancellation accessory 200 be positioned very firmly on the OWS earphone body 100. Based on this, the auxiliary noise cancellation accessory 200 may be mounted on the OWS earphone body 100 in different manners, and has low difficulty in production and fabrication.

A first protrusion 103 is provided on the earphone shell 101 corresponding to the periphery of the sound output area 102, as shown in FIGS. 1 to 3. The accessory body 201 has a corresponding first slot 204. The first protrusion 103 is detachably engaged with the first slot 204. In actual production, the shape and partial structure of the earphone shell 101 need to be slightly changed. An annular groove 104 surrounding the sound output area 102 is formed on the earphone shell 101. The first protrusion 103 is disposed on an outer annular surface 1041 inside the annular groove 104. After the accessory body 201 is inserted in the annular groove 104, the first protrusion 103 is engaged in the corresponding first slot 204, so that the accessory body 201 will not fall off from the earphone shell 101 without applying sufficient external force. When it is required to remove the auxiliary noise cancellation accessory 200, the auxiliary noise cancellation accessory 200 is directly unplugged from the earphone shell 101. In another implementation, a second slot is formed on the earphone shell corresponding to the periphery of the sound output area, and a corresponding second protrusion is provided on the accessory body. The second protrusion is detachably engaged with the second slot.

As shown in FIGS. 4 to 9, the accessory body 201 includes a casing 205 that is designed to mimic the earphone shell 101. The partition wall 202 is formed on a peripheral wall 2051 of the casing 205. The noise cancellation space 203 is located inside the casing 205. The casing 205 is detachably attached to the earphone shell 101. In this way, the design of the original OWS earphone body 100 does not need to be changed, and it is only necessary to mimic and match the design for different earphone shells. One side of the peripheral wall 2051 of the casing 205, facing the human body, is connected to an end wall 2052. The end wall 2052 has a sound hole 2053. The noise cancellation space 203 is formed in the region enclosed by the peripheral wall 2051 and the end wall 2052. The sound hole 2053 communicates with the noise cancellation space 203. When in use, the end wall 2052 is in contact with the human body. The dimension of the sound hole 2053 may be flexibly designed, so that the part of the end wall 2052, surrounding the periphery of the sound hole 2053, has enough area to form an annular area in contact with the human body, providing a better noise cancellation effect.

The accessory body 201 is a soft plastic part, such as a silicone part. At least one part of the accessory body 201, corresponding to the noise cancellation space 203, is deformable and automatically resettable, such that when the second end of the noise cancellation space 203 is squeezed, the spacing between the first end of the noise cancellation space 203 and the second end of the noise cancellation space 203 becomes smaller to meet the contact requirements of different individuals when worn. As to the accessory body 201 shown in FIGS. 1 through 6, the first slot 204 is disposed on the partition wall 202 and close to one end of the partition wall 202. The other end of the partition wall 202 has an outer ring wall 2021 extending outwardly in a folded manner. A gap 2022 is defined between the outer ring wall 2021 and the outer side of the partition wall 202. The outer ring wall 2021 and the partition wall 202 play a double partition role, providing a better noise cancellation effect. In use, when the other end of the partition wall 202 is squeezed, it is easy to deform, providing a better curved fit surface at the other end of the noise cancellation space 203. The user's experience is better.

The accessory body 201 may be an assembly of a hard part and a soft plastic part. The soft plastic part covers the outer surface of the hard part, so that the side close to the human body is a soft surface. Specifically, the accessory body 201 includes a hard casing 2011 and a soft casing 2012. Both the hard casing 2011 and the soft casing 2012 are designed to mimic the earphone shell 101. The internal dimension of the hard casing 2011 is slightly larger than the external dimension of the earphone shell 101. The internal dimension of the soft casing 2012 is slightly larger than the external dimension of the hard casing 2011. Alternatively, utilizing the deformable property of the soft casing 2012, the dimension of the soft casing 2012 is designed to be substantially equivalent to the dimension of the hard casing 2011, or the soft casing 2012 is tightly fitted on the outside of the hard casing 2011.

Regardless of whether the accessory body is fully or partially made of a soft plastic material, it is possible to utilize a soft plastic part to meet the purpose that at least part of the accessory body 201, corresponding to the noise cancellation space 203, is deformable and automatically resettable.

The OWS earphone body of the present invention may further include a noise cancellation circuit on the basis of the physical noise cancellation of the auxiliary noise cancellation accessory. The combination of the physical noise cancellation and the active noise cancellation of the noise cancellation circuit enhances the overall noise cancellation function of the OWS earphone.

The noise cancellation circuit may be a conventional noise cancellation circuit disposed in an existing earphone.

Figure 15:
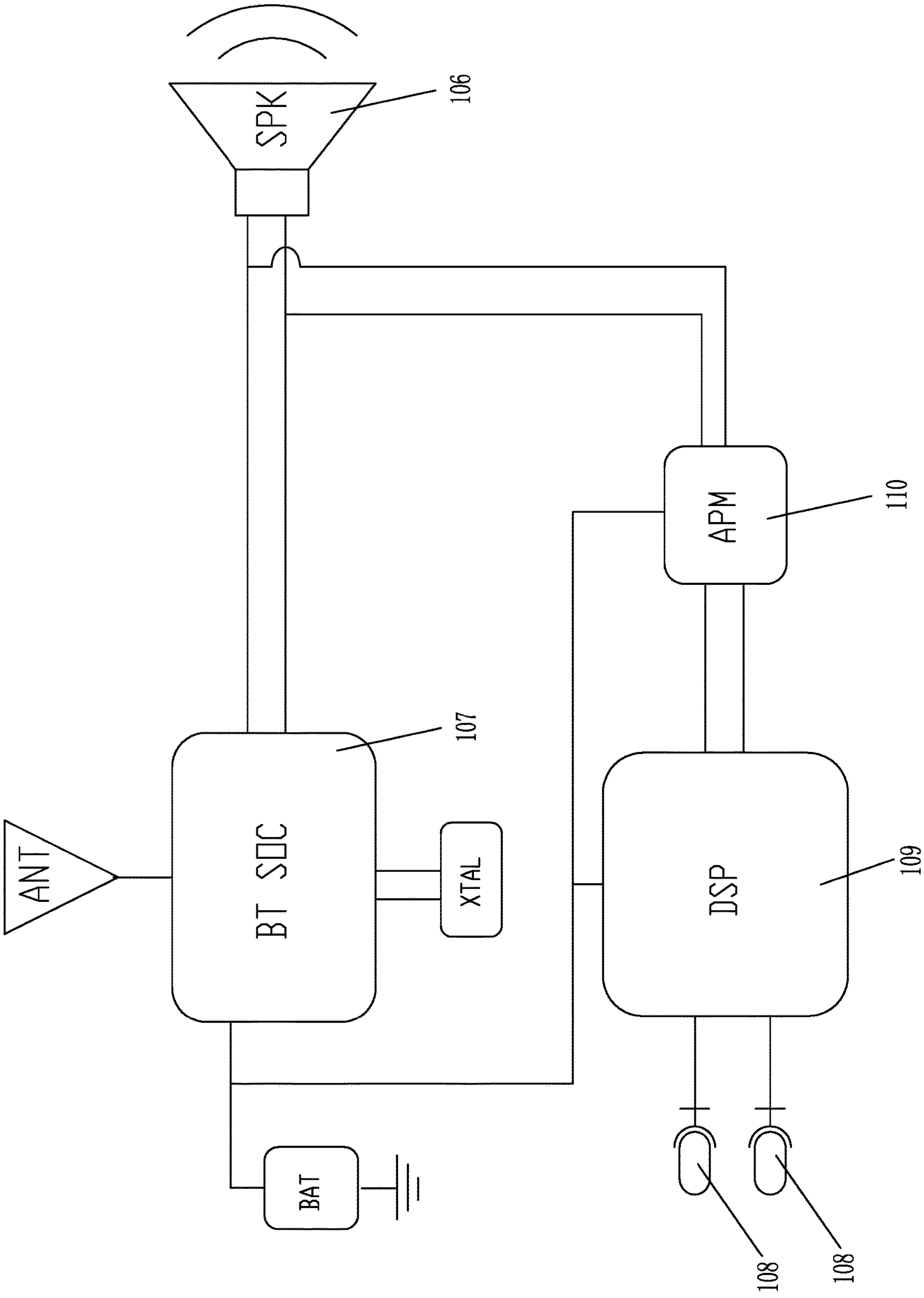
FIG. 15 is a diagram showing the circuit connection of a noise cancellation circuit in the OWS earphone body of the present invention on the basis of the physical noise cancellation of the auxiliary noise cancellation accessory.

The noise cancellation circuit may be a special noise cancellation circuit as shown in FIG. 15.

This kind of noise cancellation circuit is developed and designed by the applicant independently. Its noise cancellation effect is better than the conventional noise cancellation circuit, and the circuit structure is simple. Utilizing the ambient noise signal collected by the original microphone of the earphone, it is only necessary to add an audio DSP (digital signal processor) 109, or to add an audio DSP 109 and an audio amplifier 110. This is beneficial for the circuit layout inside the OWS earphone.

In the OWS earphone, the sound-generating unit includes a speaker 106. The input end of the speaker 106 is connected to a Bluetooth audio signal module. The Bluetooth audio signal module is configured to provide a Bluetooth audio signal. The Bluetooth audio signal module includes a Bluetooth SoC (System on a Chip) 107. The earphone shell further includes an audio collection module and a noise cancellation circuit therein. The audio collection module is configured to collect an ambient noise signal. The audio collection module includes a microphone 108 to collect the ambient noise signal. The microphone 108 may be connected to a sound pickup circuit. The noise cancellation circuit includes the audio DSP 109. The audio DSP 109 is connected to the audio collection module. Specifically, the audio DSP 109 is connected to the corresponding microphone 108 or the sound pickup circuit. The audio DSP 109 generates an inverted noise signal according to the ambient noise signal collected by the audio collection module. The inverted noise signal and the Bluetooth audio signal are connected in parallel and then connected to the speaker 106. The speaker 106 broadcasts a sound signal in which the inverted noise signal offsets the ambient noise.

Preferably, the noise cancellation circuit further includes an audio amplifier 110. The audio amplifier 110 is connected to the audio DSP 109. The audio amplifier 110 amplifies the inverted noise signal. The amplified inverted noise signal is connected in parallel with the Bluetooth audio signal and then connected to the speaker 106. In comparison, the amplified inverted noise signal has a greater ability to offset the ambient noise signal.

What is claimed is:

1. An OWS (open wireless stereo) earphone with an ANC (active noise cancellation) function, comprising:

an OWS earphone body, including an earphone shell and a sound-generating unit in the earphone shell, the earphone shell having a sound output area on one side of an outer surface of the earphone shell, facing a human body;

an auxiliary noise cancellation accessory, including an accessory body, the accessory body having a partition wall and a noise cancellation space surrounded by the partition wall;

the accessory body being detachably connected to the OWS earphone body, the noise cancellation space having a first end corresponding to and communicating with the sound output area and a second end facing the human body, wherein when in use, sounds generated by the sound-generating unit enter the noise cancellation space from the sound output area via the first end of the noise cancellation space and are transmitted to the human body from the second end of the noise cancellation space.

2. The OWS earphone as claimed in claim 1, wherein the OWS earphone body is in the form of an ear-hook OWS earphone body, and the earphone shell is connected to a first ear hook.

3. The OWS earphone as claimed in claim 1, wherein the OWS earphone body is in the form of a sports OWS earphone body, the earphone shell is connected to a second ear hook, and a rear end of the second ear hook is connected to a neck band.

4. The OWS earphone as claimed in claim 1, wherein the OWS earphone body is in the form of an ear-clip OWS earphone body, and the earphone shell is connected to an ear clip.

5. The OWS earphone as claimed in claim 1, wherein the auxiliary noise cancellation accessory is detachably connected to the earphone shell in a snap-fit manner.

6. The OWS earphone as claimed in claim 1, wherein the auxiliary noise cancellation accessory is detachably connected to the earphone shell in a sleeving manner.

7. The OWS earphone as claimed in claim 1, wherein the auxiliary noise cancellation accessory is detachably connected to the earphone shell in a magnetic attraction manner.

8. The OWS earphone as claimed in claim 1, wherein the auxiliary noise cancellation accessory is removably bonded to the earphone shell.

9. The OWS earphone as claimed in claim 1, wherein the accessory body includes a casing that is designed to mimic the earphone shell, the partition wall is formed on a peripheral wall of the casing, the noise cancellation space is located inside the casing, and the casing is detachably attached to the earphone shell.

10. The OWS earphone as claimed in claim 1, wherein the accessory body is a soft plastic part.

11. The OWS earphone as claimed in claim 1, wherein the accessory body is an assembly of a hard part and a soft plastic part, and the soft plastic part covers an outer surface of the hard part.

12. The OWS earphone as claimed in claim 1, wherein at least one part of the accessory body, corresponding to the noise cancellation space, is deformable and automatically resettable, such that when the second end of the noise cancellation space is squeezed, a spacing between the first end of the noise cancellation space and the second end of the noise cancellation space becomes smaller.

13. The OWS earphone as claimed in claim 1, wherein the OWS earphone body further includes a noise cancellation circuit.

14. The OWS earphone as claimed in claim 13, wherein the noise cancellation circuit includes an audio DSP (digital signal processor); the sound-generating unit includes a speaker, an input end of the speaker is connected to a Bluetooth audio signal module, the Bluetooth audio signal module provides a Bluetooth audio signal; an audio collection module is provided in the earphone shell, the audio collection module collects an ambient noise signal; the audio DSP is connected to the audio collection module and generates an inverted noise signal according to the ambient noise signal collected by the audio collection module, the inverted noise signal and the Bluetooth audio signal are connected in parallel and then connected to the speaker, and the speaker broadcasts a sound signal in which the inverted noise signal offsets an ambient noise.

15. The OWS earphone as claimed in claim 14, wherein the noise cancellation circuit further includes an audio amplifier, the audio amplifier is connected to the audio DSP, the audio amplifier amplifies the inverted noise signal, and the amplified inverted noise signal is connected in parallel with the Bluetooth audio signal and then connected to the speaker.

16. The OWS earphone as claimed in claim 14, wherein the audio collection module includes a microphone, and the microphone collects the ambient noise signal.

17. The OWS earphone as claimed in claim 14, wherein the Bluetooth audio signal module includes a Bluetooth SoC (System on a Chip), and the Bluetooth SoC provides the Bluetooth audio signal.

* * * * *